(12) United States Patent
Orenchuck

(10) Patent No.: US 12,488,404 B2
(45) Date of Patent: Dec. 2, 2025

(54) CROWD-SOURCED REAL ESTATE PROPERTY REVIEW SYSTEM

(71) Applicant: Diane Orenchuck, Newton, NJ (US)

(72) Inventor: Diane Orenchuck, Newton, NJ (US)

(*) Notice: Subject to any disclaimer, the term of this patent is extended or adjusted under 35 U.S.C. 154(b) by 37 days.

(21) Appl. No.: 18/610,451

(22) Filed: Mar. 20, 2024

(65) Prior Publication Data
US 2025/0299275 A1    Sep. 25, 2025

(51) Int. Cl.
*G06Q 50/163* (2024.01)
*G06Q 30/0645* (2023.01)

(52) U.S. Cl.
CPC ....... *G06Q 50/163* (2013.01); *G06Q 30/0645* (2013.01)

(58) Field of Classification Search
None
See application file for complete search history.

(56) References Cited

U.S. PATENT DOCUMENTS

| | | | | |
|---|---|---|---|---|
| 8,630,991 | B2* | 1/2014 | Rao | G06Q 10/10 707/726 |
| 9,461,876 | B2* | 10/2016 | Van Dusen | G06N 20/00 |
| 9,594,756 | B2* | 3/2017 | Sabharwal | G06F 16/93 |
| 9,912,674 | B2* | 3/2018 | Stob | H04W 4/02 |
| 11,798,068 | B1* | 10/2023 | Adhav | G06Q 50/163 |
| 12,073,459 | B1* | 8/2024 | Adhav | G06Q 30/0645 |
| 2004/0220906 | A1* | 11/2004 | Gargi | G06Q 30/06 |
| 2008/0306982 | A1* | 12/2008 | Moudy | G06Q 30/02 707/999.102 |
| 2011/0295722 | A1* | 12/2011 | Reisman | G06Q 30/0641 705/26.1 |
| 2014/0075004 | A1* | 3/2014 | Van Dusen | G06F 16/90335 709/223 |

(Continued)

FOREIGN PATENT DOCUMENTS

| | | | | |
|---|---|---|---|---|
| WO | WO-0070424 | A2 * | 11/2000 | G06Q 30/06 |
| WO | WO-2020051487 | A1 * | 3/2020 | G06Q 30/06 |
| WO | WO-2024006475 | A1 * | 1/2024 | G06Q 50/16 |

OTHER PUBLICATIONS

• Nicola Donovan. "Spotlight on: property crowdfunding." (Jun. 11, 2019). Retrieved online Jun. 25, 2025. https://partner.booking.com/en-GB/click-magazine/trends-insights/spotlight-property-crowdfunding (Year: 2019).*

(Continued)

*Primary Examiner* — James A Reagan
(74) *Attorney, Agent, or Firm* — Thomas J. Germinario

(57) ABSTRACT

A crowd-sourcing real property review system digitally submits and compiles reviews of for-sale and for-rent real estate properties in selected market areas. This system is implemented by means of a downloadable crowd-sourcing user app and a publicly-accessible online web platform. The user app is configured to enable the system users to prepare and upload digital user reviews to the web platform, or alternatively to compose and submit digital user reviews directly on the web platform. The user reviews comprise first-hand observations and user ratings regarding the for-sale and for-rent real estate properties, and optionally can include photographs and/or videos of the properties. The web platform displays interactive maps of the selected market areas.

5 Claims, 3 Drawing Sheets

(56) References Cited

U.S. PATENT DOCUMENTS

| | | | | |
|---|---|---|---|---|
| 2014/0172727 A1* | 6/2014 | Abhyanker | ............ | G06Q 50/40 |
| | | | | 705/307 |
| 2015/0213315 A1* | 7/2015 | Gross | ........................ | G06T 5/50 |
| | | | | 382/159 |
| 2016/0004999 A1* | 1/2016 | Chivetta, III | .......... | G06Q 40/06 |
| | | | | 705/301 |
| 2016/0027307 A1* | 1/2016 | Abhyanker | ............ | G08G 1/005 |
| | | | | 701/117 |
| 2018/0060981 A1* | 3/2018 | Sher | ..................... | G06Q 50/163 |
| 2018/0150925 A1* | 5/2018 | Logan | ..................... | G06Q 50/16 |
| 2018/0216946 A1* | 8/2018 | Gueye | ................ | G01C 21/3617 |
| 2018/0322597 A1* | 11/2018 | Sher | ..................... | G06Q 50/163 |
| 2022/0036486 A1* | 2/2022 | Dhandapani | ........... | G06N 20/00 |
| 2024/0378648 A1* | 11/2024 | Holbrook | .............. | H04W 12/06 |

OTHER PUBLICATIONS

• Xiao Huang et al. "Crowdsourcing Geospatial Data for Earth and Human Observations: A Review." (Jan. 19, 2024). Retrieved online Jun. 25, 2025. https://filipbiljecki.com/publications/2024_jrs_crowdsourcing.pdf (Year: 2024).*

• Araz �� aeihagh. "Crowdsourcing: a new tool for policy-making?". (Dec. 2017). Retrieved online Jun. 25, 2025. Retrieved online Jun. 25, 2025. https://www.researchgate.net/publication/320932758_Crowdsourcing_a_new_tool_for_policy-making (Year: 2017).*

* cited by examiner

CROWD-SOURCED REAL ESTATE PROPERTY REVIEW SYSTEM

FIELD OF INVENTION

The present invention relates to the general field of systems for digitally submitting and compiling information, which is gathered by crowd-sourcing from system users. More particularly, the present invention relates to the field of such systems which digitally compile and publish crowd-sourced information concerning for-sale and for-rent real estate properties.

BACKGROUND OF THE INVENTION

The popularity of digital platforms which solicit and compile crowd-sourced information from the on-line community has increased dramatically in the past few decades. Examples range from internet encyclopedias, such as Wikipedia, which draw upon crowd-sourced content, to internet restaurant reviews, such as Yelp, which draw upon crowd-sourced ratings and reviews. As used in this patent specification, the term crowd-sourcing will refer to a system for obtaining content for an online information platform from members of the general online community who elect to become system users, and who upload their content to the platform by means of a publicly-accessible online web platform and/or an application software ("app") which runs on the users' digital devices. In the present invention, the crowd-sourced content comprises reviews and ratings of for-sale and for-rent real estate properties by system users who have personally visited/viewed the properties and have identified positive and/or negative aspects of the properties. As used in this patent specification, the terms "for-sale" and "for-rent" refer to real estate properties that have been offered for sale or rent at the time user reviews of the properties have been submitted to the system's publicly-accessible web platform, regardless of whether the properties continue to be offered for sale or rent thereafter.

SUMMARY OF THE INVENTION

The present invention is a system which digitally compiles and publishes reviews of for-sale and for-rent real estate properties in selected market areas. This system is implemented by means of a downloadable crowd-sourcing user app and a publicly-accessible online web platform. The user app is configured to enable the system users to prepare and upload digital user reviews from the app to the web platform, or alternatively to compose and submit digital user reviews directly on the web platform. As used in this patent specification and in the claims which follow, the terms "submit," "submitted" or "submission," with respect to user content (including user reviews and ratings), refer both to user content uploaded to the web platform via the user app and user content directly composed and submitted by the user on the web platform. The user reviews comprise first-hand observations and user ratings regarding the for-sale and for-rent real estate properties, and optionally can incorporate photographs and/or videos of the properties.

The web platform displays interactive maps of the selected market areas. For each property for which user reviews have been uploaded, each of the interactive maps displays a property identifier, which indicates the approximate location of the identified property and an overall rating. The overall rating preferably comprises numerical, alphabetical and/or graphical indicia, such as stars.

Each of the property identifiers is configured to incorporate user links to one or more levels of information regarding the identified property, with access to the levels based on user fees which increase from the first level upward through the higher levels. For example, the first level user link could provide access only to one user's submitted content for the identified property, while the second level link could access all externally-sourced content for the identified property. Further levels of access, such as whole geographic areas, can be purchased for an even higher fee. The user app is configured to enable the system users to receive user credits for submitting user reviews to the web platform, and it is also configured, through a user account portal, to apply the user credits to payment of the user access fees.

Optional features of the present invention incorporate rating tags in the property identifiers, which rating tags indicate specific property features to which the user reviews refer. The web platform can display previously submitted content indefinitely, which may extend past the property being actively for sale or rent. The web platform can also be configured to apply filters to block publication of user reviews prepared by brokers or owners of the for-sale real properties, and/or to block publication of malicious or defamatory content in the user reports. The web platform can also be configured to offer all or select content to be viewable free of charge as desired. The web platform can also be configured to offer access to content unlocked using credits for a selected duration of time or in perpetuity.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
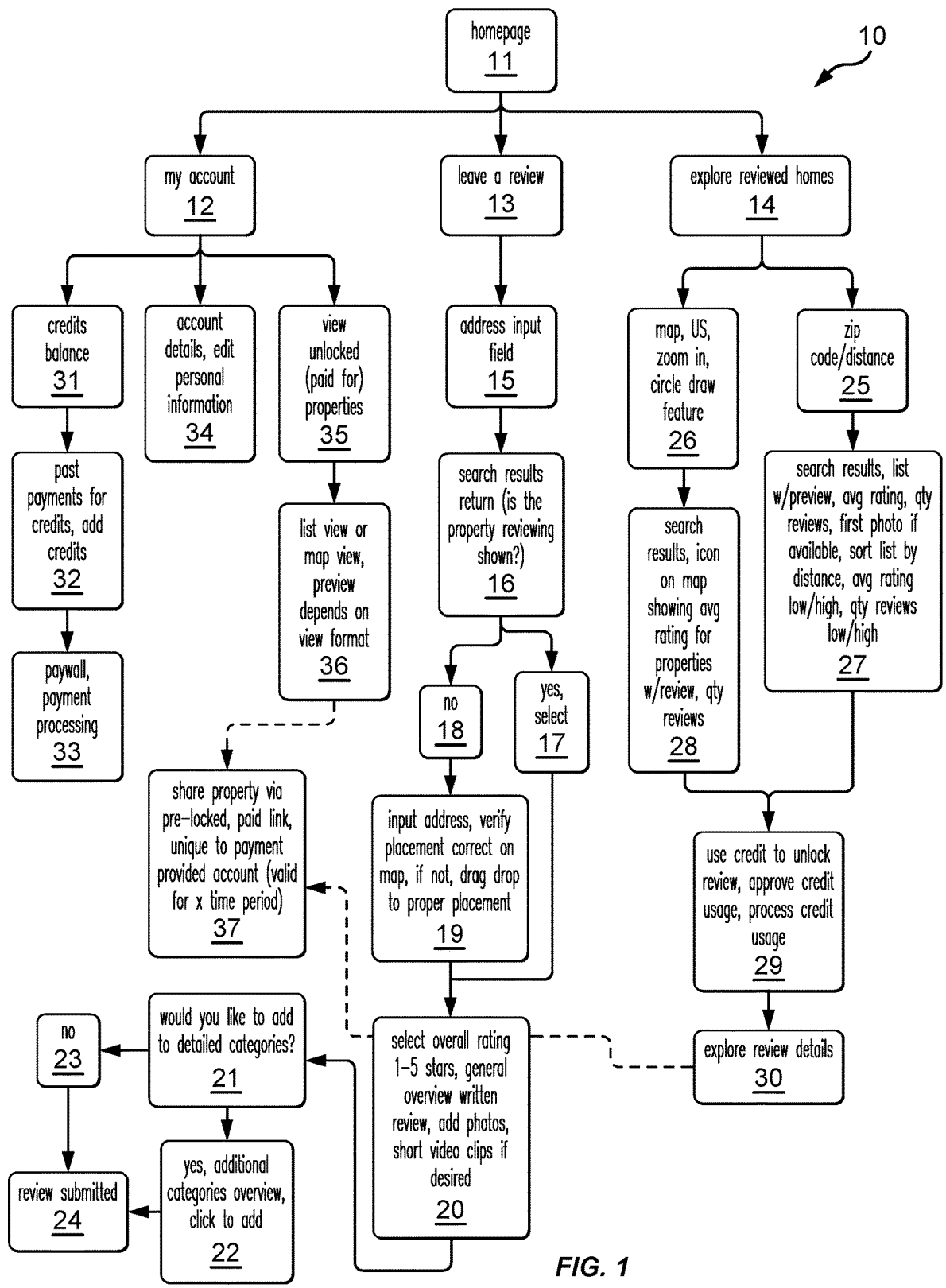
FIG. 1 is an exemplary flow chart for the web platform, according to one embodiment of the present invention.

Referring to FIG. 1, an illustrative flow chart of the operations of the online web platform 10 in conjunction with the user app is shown. From the user app, which runs on a digital device of the system user, the system user signs into the homepage 11, from which they can access the user account portal 12, the user review portal 13, and the property search portal 14.

From the user review portal 13, the system user inputs the address of the property 15 for which they want to submit their user review. In response to the address input 15, the web page returns a list of properties currently in the system 16, at which point the system user can select one of the listed properties 17. If the listed properties 16 do not include the one for which the system user wants to submit content 18, the system user can initiate a new property listing 19 by inputting the address and verifying its placement on the interactive map 26. The system user next selects an overall rating of 1 to 5 stars and submits their user review, inclusive of written observations, photos and short video clips 20. After submitting their review 20, the system user can add category tags 21 that refer to specific aspects of the property addressed in their review 22, or they can decline to do so 23 and proceed directly to review submission 24.

Figure 2:
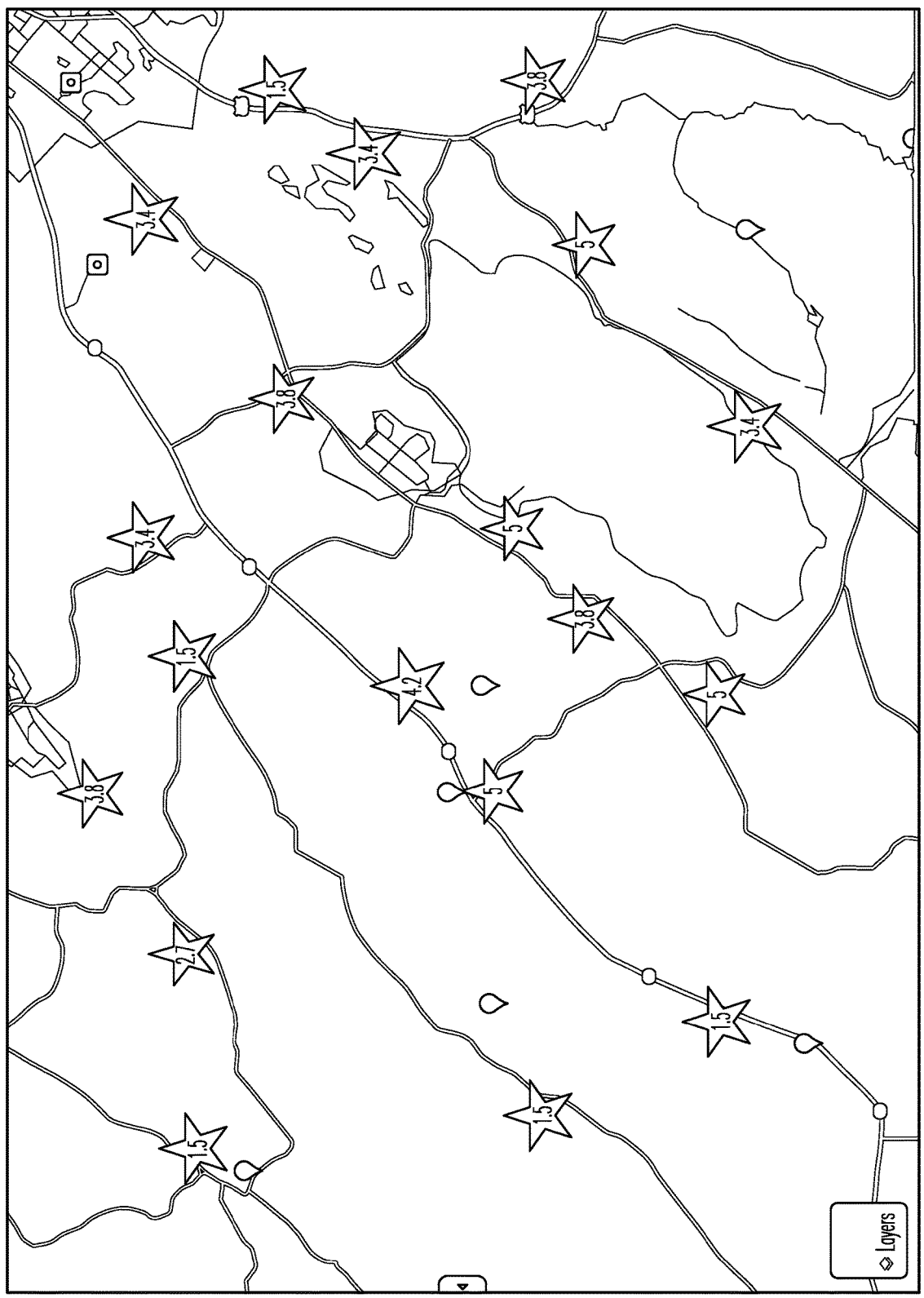
FIG. 2 is an exemplary interactive map, as displayed on the web platform in local view, according to one embodiment of the present invention.
Figure 3:
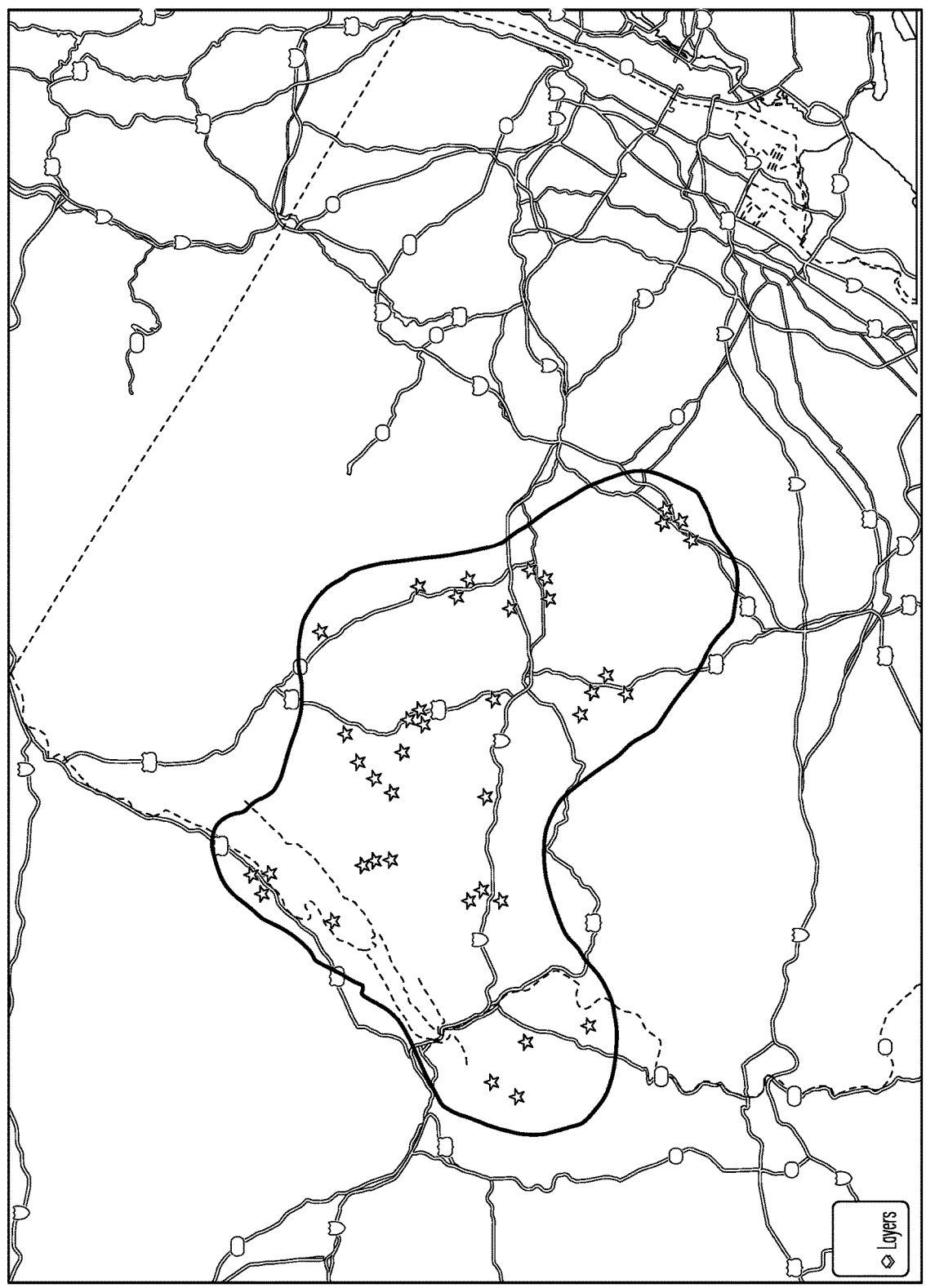
FIG. 3 is the exemplary interactive map of FIG. 2, as displayed on the web platform in regional view, according to one embodiment of the present invention.

From the property search portal 14, the system user can initiate a new search either by inputting property details 25, such as zip code or distance from the user's location, or by using the interactive map 26, on which they can zoom in or out, from regional to local views, to the desired level of detail, as shown in FIGS. 2 and 3. In both cases, the search results 27 28 will display the address of the property, overall rating of the property, based on the average rating of the user reviews, as well as the number of user reviews. The interactive map listing 28 will also display a property identifier icon with 1-5 star rating at the approximate location on the property or the map, as shown in FIG. 2. Access to the user reviews of the property can then be unlocked 29 by applying user credits, which may be purchased or earned based on submitted user reviews. After unlocking the reviews at the user access level corresponding to the applied user credits 29, the system user can then review the details of the user reviews 30.

From the user account portal 12, the system user can check their user credits balance 31, review past credit payments, and add new credits 32, based either on new payments 33 or credits earned from submitted user reviews. From the user account portal 12, account details 34, such as personal information, can also be added or edited. Previously unlocked user reviews can also be viewed 35 and displayed either in list format or map view 36. User reviews submitted by the system user 20 can also be shared for limited time periods via pre-locked, paid link 37.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A method of digitally submitting and compiling reviews of multiple for-sale and for-rent real estate properties in multiple selected market areas, wherein the method is implemented in accordance with the following steps:
    (a) providing a downloadable, crowd-sourcing user app to multiple system users, wherein each of the system users downloads the user app to a computer-readable storage medium of a digital device on which the user app runs, and wherein the user app is configured to enable the system users to prepare multiple digital user reviews, and wherein the user reviews comprise first-hand observations and user ratings by the system users regarding the for-sale or for-rent real estate properties; and
    (b) providing a publicly-accessible online web platform to which the system users can submit the user reviews, wherein the web platform displays interactive maps of the selected market areas, and wherein each of the interactive maps displays one or more property identifiers indicating approximate locations of the for-sale and for-rent real estate properties for which the user reviews have been submitted, and wherein the property identifiers display overall evaluation ratings, based on averages of the user ratings, for the for-sale and for-rent real estate properties for which user reviews have been submitted, and wherein each of the property identifiers is configured to incorporate a first level user link to the user reviews that have been submitted to the web platform, and wherein the first level user link is configured to be accessible only to first-level-authorized system users, who have been issued a first level link access based on the payment of a first level user access fee through a user account portal of the web platform.

2. The method according to claim 1, further comprising the following additional steps:
    (c) configuring the user app and the web platform to enable the system users to include photographs and videos in the user reviews; and
    (d) configuring the interactive maps of the web platform to incorporate in each of the property identifiers rating indicia representing the overall average evaluation ratings for each of the for-sale and for-rent real estate properties for which user reviews have been submitted, wherein the rating indicia can comprise numerical, alphabetical or graphical indicia, or combinations thereof.

3. The method according to claim 2, further comprising the following additional steps:
    (e) configuring the property identifiers to incorporate at least one higher level user link to externally-sourced information concerning the for-sale and for-rent real estate properties, and wherein each higher level link is configured to be accessible only to higher-level-authorized system users, who have been issued a higher level link access based on payment of a higher level user access fee through the user account portal of the web platform; and
    (f) configuring the user app to enable the system users to receive user credits for submitting the user reviews to the web platform, and configuring the user account portal to apply the user credits to payment of the first level user access fee or the higher level user access fee.

4. The method according to claim 3, further comprising the following additional step:
    (g) configuring each of the interactive maps of the web platform to incorporate in each of the property identifiers one or more rating tags, wherein the rating tags indicate specific property features to which the user reviews refer.

5. The method according to claim 4, further comprising the following additional step:
    (h) configuring the web platform to apply filters to block publication of user reviews prepared by brokers or owners of the for-sale and for-rent real estate properties, and to block publication of malicious or defamatory content in the user reviews.

* * * * *